(12) United States Patent
Ray et al.

(10) Patent No.: US 10,995,639 B1
(45) Date of Patent: May 4, 2021

(54) VALVE APPARATUS FOR USE WITH A POSITIVE CRANKCASE VENTILATION VALVE AND INTAKE MANIFOLD TO ENHANCE FUEL ECONOMY OF AN ENGINE

(71) Applicants: Richard Wyatt Ray, Rancho Cucamonga, CA (US); Bradly Paul Ray, Montclair, CA (US); Douglas Hobart Ray, Jr., Whittier, CA (US)

(72) Inventors: Richard Wyatt Ray, Rancho Cucamonga, CA (US); Bradly Paul Ray, Montclair, CA (US); Douglas Hobart Ray, Jr., Whittier, CA (US)

( * ) Notice: Subject to any disclaimer, the term of this patent is extended or adjusted under 35 U.S.C. 154(b) by 0 days.

(21) Appl. No.: 16/882,232

(22) Filed: May 22, 2020

Related U.S. Application Data

(60) Provisional application No. 62/852,162, filed on May 23, 2019.

(51) Int. Cl.
*F01M 13/02* (2006.01)
*F02M 25/06* (2016.01)
*F01M 13/00* (2006.01)
*F01M 13/04* (2006.01)

(52) U.S. Cl.
CPC .......... *F01M 13/023* (2013.01); *F02M 25/06* (2013.01); *F01M 2013/0044* (2013.01); *F01M 2013/0438* (2013.01); *F02D 2250/08* (2013.01)

(58) Field of Classification Search
CPC ......... F01M 13/023; F01M 2013/0044; F01M 2013/0438; F01M 13/0011; F02M 25/06; F02D 2250/08
See application file for complete search history.

(56) References Cited

U.S. PATENT DOCUMENTS

2016/0138442 A1* 5/2016 An .................. F01M 13/021
123/559.1
2018/0163659 A1* 6/2018 Dudar ............... B60W 50/0205

* cited by examiner

*Primary Examiner* — Jacob M Amick
(74) *Attorney, Agent, or Firm* — Plager Schack LLP

(57) ABSTRACT

A valve apparatus designed to control the flow of crankcase gases from a positive crankcase ventilation valve to an intake manifold of an internal combustion engine is provided. The valve apparatus is designed to adjust during idle, cruising, acceleration and wide-open throttle modes of the engine to enhance fuel economy. The valve apparatus includes a valve body having a main inlet coupled to the positive crankcase ventilation valve and a main outlet, an orifice piston slidably mounted to an interior of the valve body and having an end face with a central hole and a plurality of secondary holes, an end cap coupled to the main outlet of the valve body and intake manifold of the engine, a seal disposed within the end cap and having a central opening, and a spring connected to the orifice piston and seal.

10 Claims, 4 Drawing Sheets

CRANKCASE GASES - DIRECTION OF FLOW THROUGH VALVE

VALVE APPARATUS FOR USE WITH A POSITIVE CRANKCASE VENTILATION VALVE AND INTAKE MANIFOLD TO ENHANCE FUEL ECONOMY OF AN ENGINE

RELATED APPLICATION

The application claims priority to provisional patent application U.S. Ser. No. 62/852,162 filed on May 23, 2019, the entire contents of which is herein incorporated by reference.

BACKGROUND

The embodiments herein relate generally to positive crankcase ventilation valves. More specifically, embodiments of the invention are directed to a vacuum-controlled valve apparatus for use with a positive crankcase ventilation valve and an intake manifold of an internal combustion engine.

A positive crankcase ventilation (PCV) valve of a vehicle channels escaped crankcase gases from an internal combustion engine back into the intake manifold to be pumped into the cylinders and pistons of the engine to complete another combustion cycle. Automobile engines have factory designed vacuum leaks, which consume excessive fuel especially at idle. This decreases fuel economy and increases exhaust emissions.

At idle, a healthy automotive gasoline engine typically produces 18 or more inches of mercury of vacuum. On a OEM PCV system, the crankcase gases are pulled through into the intake manifold via the PCV valve. On most systems this is a substantial vacuum draw at idle into the intake manifold, which prohibits ideal fuel economy. Under acceleration, wide-open throttle and cruising speeds, vacuum drops off in the engine.

In view of the foregoing, there is a need in the industry for a valve apparatus for use with a PCV valve and an intake manifold of an internal combustion engine that addresses the limitations of the prior art, which adjusts to substantially reduce the vacuum flow when the engine is at idle. This allows the vehicle's oxygen sensors to identify less oxygen in the exhaust gases, which allows the onboard computer to signal the fuel injectors (on OBD2 systems) of the vehicle to reduce the amount of fuel injected into the engine's cylinders. This enhances gas mileage and engine efficiency substantially on most vehicles.

SUMMARY

In certain embodiments of the invention, a valve apparatus configured to control the flow of crankcase gases from a positive crankcase ventilation valve to an intake manifold of an internal combustion engine is provided. The valve apparatus is configured to adjust during idle, cruising, acceleration and wide-open throttle modes of the engine to enhance fuel economy. The valve apparatus comprises a vacuum-controlled valve body comprising a main inlet configured to couple to the positive crankcase ventilation valve and a main outlet, an orifice piston slidably mounted to an interior of the valve body proximate the main outlet, the orifice piston having an end face comprising a central hole and a plurality of secondary holes disposed therethrough, a first end cap coupled to the main outlet of the valve body and configured to couple to the intake manifold of the engine, a seal disposed within the first end cap and comprising a central opening, and a spring connected to the orifice piston and seal, wherein elevated vacuum draw within the valve body at the idle mode of the engine compresses the spring to actuate the orifice piston to a closed position against the seal, thereby sealing the secondary holes in the piston to permit crankcase gases in the valve body to flow through the central hole in the orifice piston and central opening of the seal to the intake manifold, wherein reduced vacuum draw within the valve body at cruising and wide-open throttle modes extends the spring to actuate the orifice piston to an open position away from the seal, thereby permitting crankcase gases in the valve body to flow through the central hole and secondary holes in the orifice piston and central opening of the seal to the intake manifold.

In one embodiment, the valve apparatus comprises a filter and one-way valve configured to deposit captured oil vapor in the crankcase gases to an oil filler neck associated with the engine.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
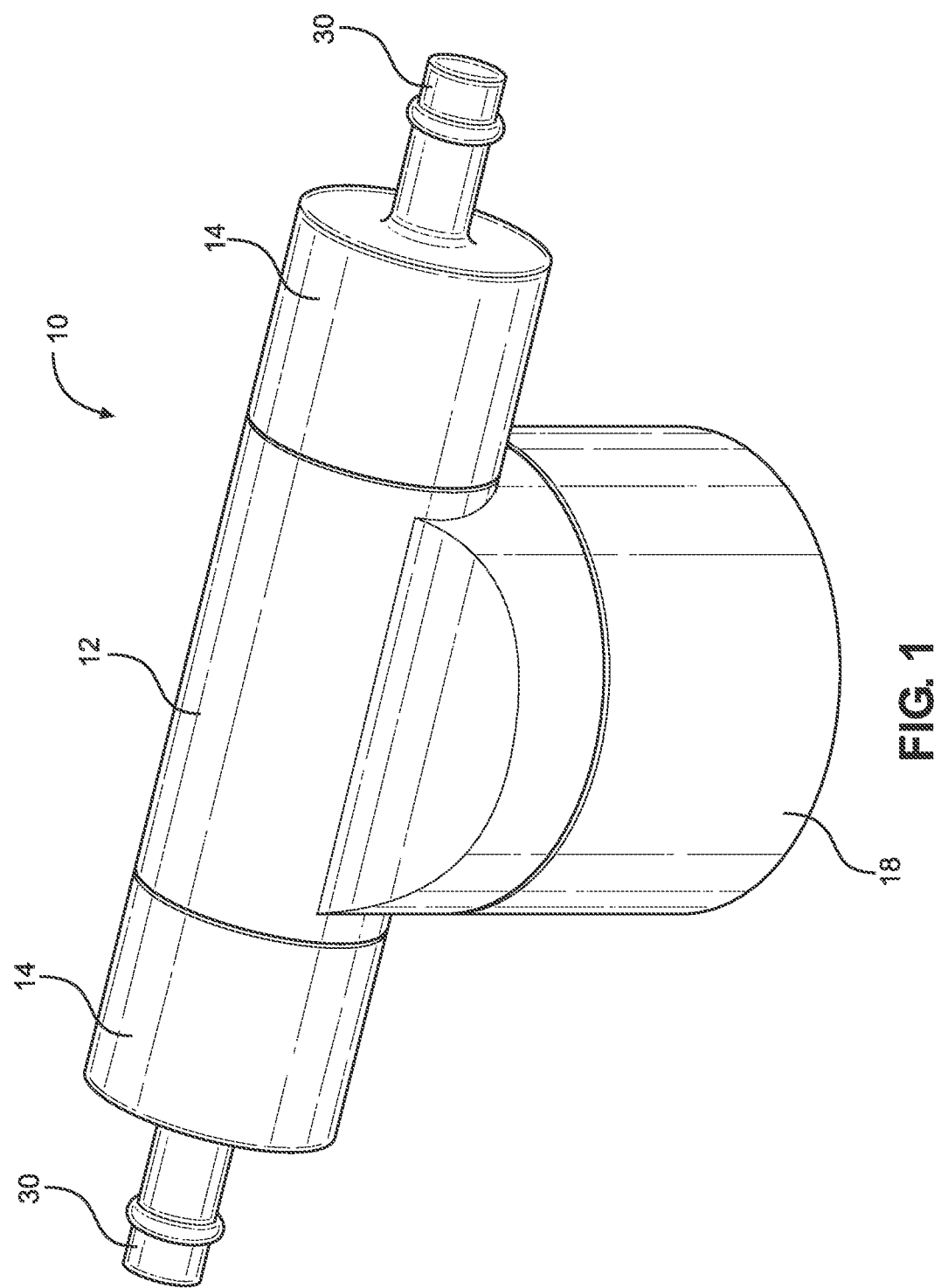
FIG. 1 depicts a perspective view of certain embodiments of the valve apparatus.
Figure 2:
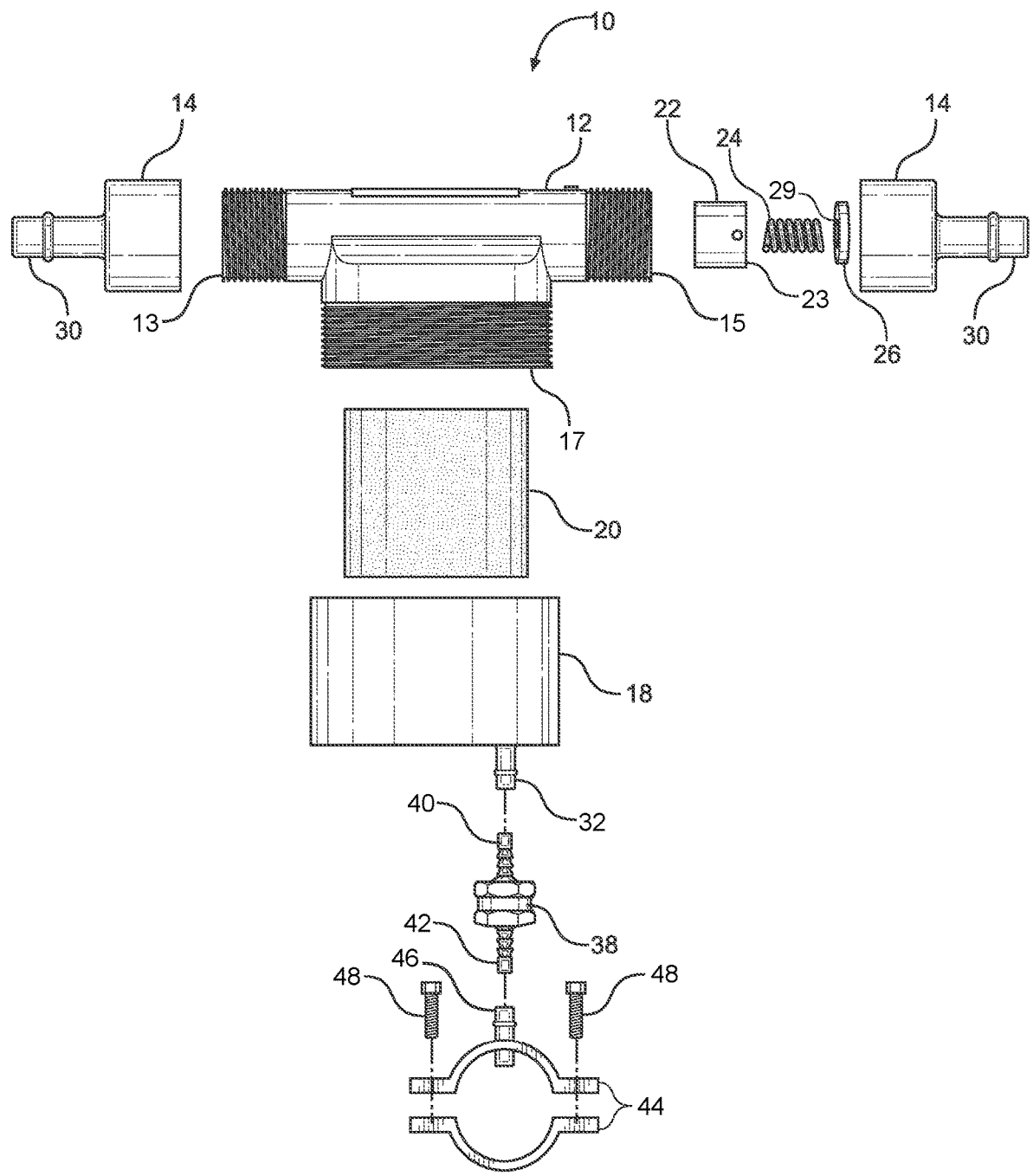
FIG. 2 depicts an exploded view of certain embodiments of the valve apparatus.
Figure 3:
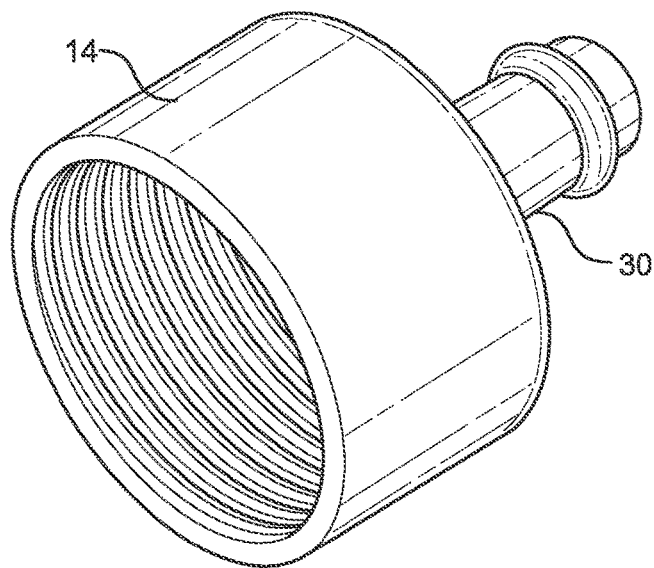
FIG. 3 depicts a perspective view of certain embodiments of the valve apparatus illustrating end cap 14.

In certain embodiments as depicted in FIGS. 1-3, valve apparatus 10 is configured to control the flow of crankcase gases from a positive crankcase ventilation valve to an intake manifold of an internal combustion engine of a vehicle. Valve apparatus 10 is configured to adjust during idle, cruising, acceleration and wide-open throttle modes of the engine to enhance fuel economy. It shall be appreciated that valve apparatus 10 can be beneficial for use with any fuel-injected engines or carbureted engines used in vehicles.

In one embodiment as depicted in FIGS. 1-2, valve apparatus 10 generally comprises vacuum-controlled valve body 12, end caps 14, bowl 18, orifice piston 22, spring 24 and seal 26. It shall be appreciated that components of valve apparatus 10 including valve body 12, end caps 14, bowl 18, orifice piston 22 and seal 26 can be made from any material including, but not limited to, 6061 aluminum, other types of aluminum, steel, other metals, Acrylonitrile Butadiene Styrene (ABS) plastic, Acrylic Styrene Acrylonitrile (ASA) plastic and other materials.

In one embodiment as depicted in FIGS. 1-2, vacuum-controlled valve body 12 comprises main inlet 13, main outlet 15 and second outlet 17 connected together by an internal cavity of the valve body. The exterior surfaces of main inlet 13, main outlet 15 and second outlet 17 comprise threads to permit the attachment of additional members thereto. In one embodiment as depicted in FIGS. 2-3, a pair of end caps 14 comprise internal threads that couple to the exterior threads at main inlet and outlet 13, 15 of valve body 12. Bowl 18 comprises internal threads that couple to exterior threads of second outlet 17 of valve body 12.

In one embodiment as depicted in FIGS. 1-3, each end cap 14 comprises a tubular member that is continuously connected to barb 30. The diameter of the tubular member is larger than the diameter of barb 30. In one embodiment, barb 30 of end cap 14 connected to main inlet 13 of valve body 12 is connected to a positive crankcase ventilation valve of the vehicle. Barb 30 of the other end cap 14 connected to main outlet 15 of valve body 12 is connected to an intake manifold of the engine of the vehicle.

In one embodiment as depicted in FIGS. 2 and 5, orifice piston 22 is slidably mounted to the interior of valve body 12 proximate main outlet 15. Orifice piston 22 comprises a tubular member with end face 23 having central hole 25 and a plurality of secondary holes 27. In one embodiment, the diameter of each hole in central hole 25 and secondary holes 27 is approximately 0.050". In one embodiment, the diameter of each hole in central hole 25 and secondary holes 27 is within the approximate range of 0.010"-0.25". In an alternative embodiment, each hole 25, 27 can have any alternative diameter. In one embodiment, orifice piston 22 comprises two secondary holes 27 on end face 23. However, end face 23 of orifice piston 22 can have any alternative number of secondary holes 27 in alternative embodiments.

In one embodiment as depicted in FIGS. 2 and 5, seal 26 and spring 24 are disposed within end cap 14. In this embodiment, end cap 14 comprises an internal recess that receives seal 26 and spring 24. In this configuration, spring 24 is operably connected to orifice piston 22 and extends through central opening 29 in seal 26 to the internal recess of end cap 14. In one embodiment, spring 24 comprises a first end coupled to orifice piston 22 and a second end coupled to seal 26. Spring 24 is configured to compress or extend to actuate orifice piston 22 as will be described later.

Figure 4:
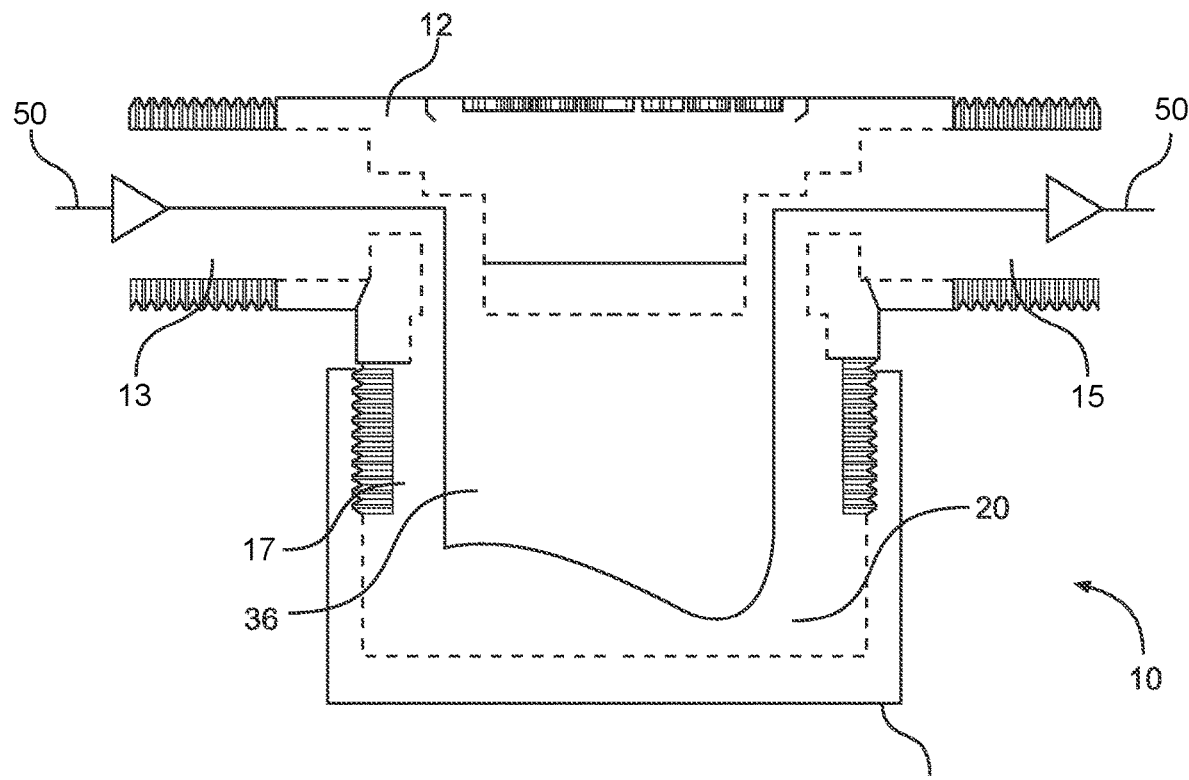
FIG. 4 depicts a section view of certain embodiments of the valve apparatus illustrating the direction of flow of crankcase gases through the valve apparatus.

In one embodiment as depicted in FIGS. 1-2 and 4-5, bowl 18 comprises internal threads that engage with exterior threads on second outlet 17 of valve body 12. As depicted in FIGS. 2 and 4, filter 20 is disposed in bowl 18 within filter cage 36. Filter 20 is configured to capture oil vapor and particulates present in the crankcase gases that flow through valve body 12. Filter 20 can be made from various materials including, but not limited to, a mesh or intertwined fibers made from plastic, cellulose, nylon, finely shaved metal strings, copper scrubbing material, and the like.

In one embodiment as depicted in FIG. 2, bowl 18 comprises bowl outlet 32, which is connected to an oil filler neck of the vehicle using one-way check valve 38 and flange drain 44. Oneway check valve 38 comprises valve inlet 40, which connects to bowl outlet 32 by a hose (not shown). Valve outlet 42 of one-way check valve 38 connects to flange connector 46, which couples to flange drain 44 and the oil filler neck.

In one embodiment, valve inlet 40 and valve outlet 42 comprise an inner diameter of ⅛" and an outer diameter of ¼". However, these dimensions can vary in alternative embodiments. In one embodiment, one-way check valve 38 is made from aluminum. However, the valve can be made from other materials known in the field in other embodiments.

In one embodiment, flange drain 44 comprises brackets that dispose around the oil filler neck and are secured in place by fasteners 48 such as bolts or screws. During the time when oneway check valve 38 is in the open position, captured oil vapor in filter 20 flows through bowl outlet 32, one-way check valve 38 and flange connector 46 to the oil filler neck of the vehicle.

In one embodiment as depicted in FIGS. 4-5, the operation of valve apparatus 10 is illustrated in detail. As depicted in FIG. 4, crankcase gases generally flow along path 50 from the PCV valve through main inlet 13 of valve body 12. Once inside valve body 12, the crankcase gases flow downward through a tube connected to the main inlet side of valve body 12. The crankcase gases are directed to the bottom of bowl 18 and pass through filter 20, which captures oil vapor and particulates present in the gases. The filtered crankcase gases flow through orifice piston 22 and main outlet 15 of valve body 12 to the intake manifold, which channels the crankcase gases back into the cylinders and pistons of the engine to be added to another combustion cycle.

Figure 5A:
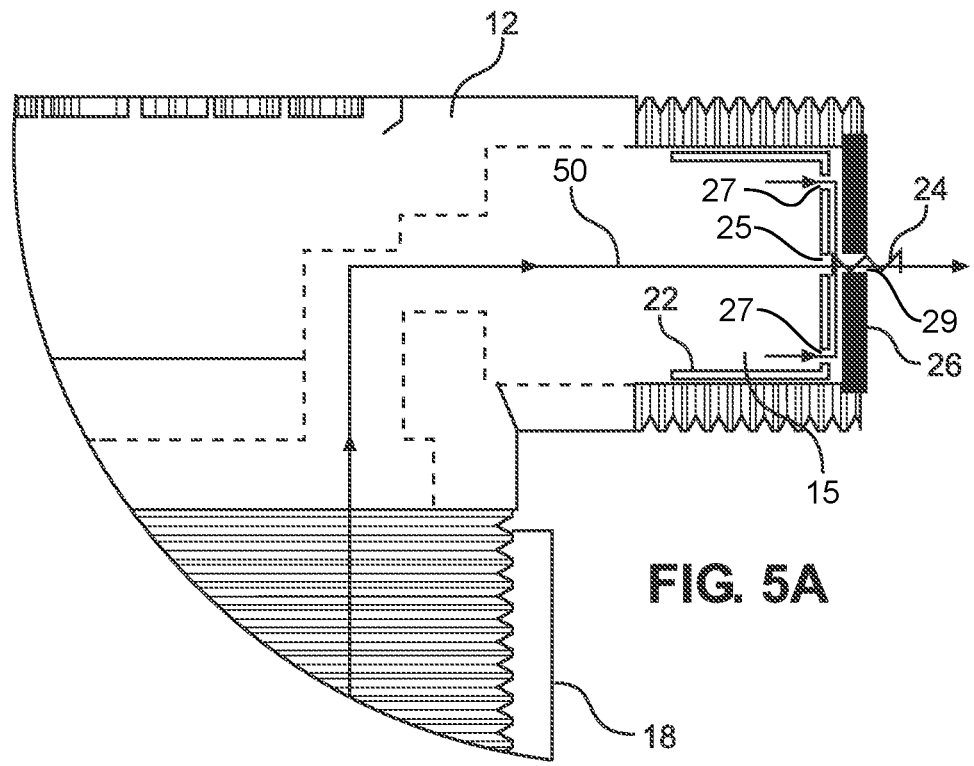
FIG. 5A depicts a section view of certain embodiments of the valve apparatus illustrating actuation of orifice piston 22 to an open position during acceleration, cruise and wide-open throttle modes of the engine.
Figure 5B:
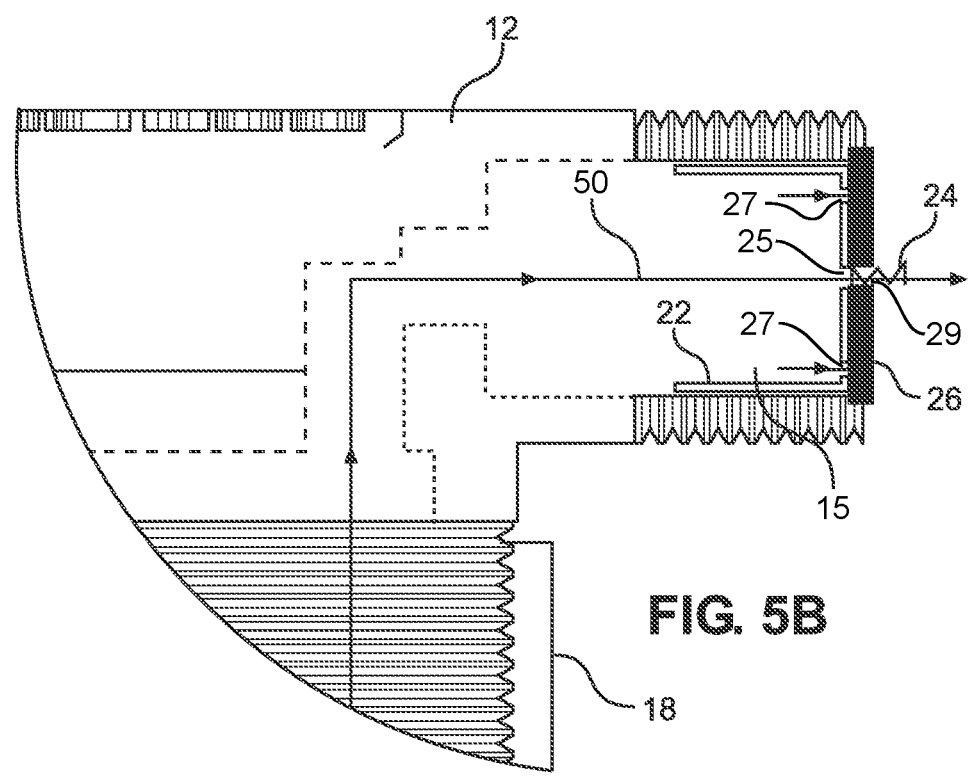
FIG. 5B depicts a section view of certain embodiments of the valve apparatus illustrating actuation of orifice piston 22 to a closed position during an idle mode of the engine.

In one embodiment as depicted in FIG. 5B, the operation of valve apparatus 10 is illustrated when the engine is in an idle mode. During an idle mode of the engine, the substantial and elevated vacuum draw (manifold vacuum) present force closes the vacuum-controlled orifice piston 22 to the closed position against seal 26. Actuation of orifice piston 22 in this manner is permitted by the compression of spring 24. This closes and seals secondary holes 27 in orifice piston 22 against seal 26, thereby allowing the flow of crankcase gases to flow solely through central hole 25 of orifice piston 22 and central opening 29 of seal 26 to the intake manifold.

This reduces vacuum flow to the minimum allowed by the valve when the engine is at idle. As a result, the vehicle's oxygen sensors identify less oxygen in the exhaust gases, which allows the onboard computer to signal the fuel injectors (on OBD2 systems) of the vehicle to reduce the amount of fuel injected into the engine's cylinders. This enhances gas mileage and engine efficiency substantially on most vehicles.

In one embodiment as depicted in FIG. 5A, the operation of valve apparatus 10 is illustrated when the engine is in an acceleration, cruise and wide-open throttle modes. During acceleration or wide-open throttle, the vacuum draw falls off sharply, thereby allowing spring 24 to extend and actuate vacuum-controlled orifice piston 22 to the open position away from seal 26. This allows the flow of crankcase gases through central hole 25 and secondary holes 27 in orifice piston 22 and central opening 29 of seal 26 to the intake manifold. This allows maximum crankcase ventilation to resume.

In one embodiment, one-way check valve 38 operably adjusts automatically to the open or closed positions depending on the level of vacuum present within valve apparatus 10.

During the presence of a substantial and elevated vacuum draw (manifold vacuum) when the engine is at idle or light acceleration modes, one-way check valve 38 adjusts to the closed position. This prevents captured oil vapor on filter 20 in bowl 18 from flowing through one-way check valve 38 to the oil filler neck of the vehicle.

During the presence of little to no vacuum when the engine is under quick acceleration, wide-open throttle or OFF modes, one-way check valve 38 adjusts to the open position. This allows captured oil vapor on filter 20 in bowl 18 to flow through one-way check valve 38 to the oil filler neck of the vehicle.

As shall be apparent, the valve and vacuum-controlled orifice piston is mechanically controlled by spring pressure and vacuum forces. The opening diameters drilled into the piston can vary pending vehicle application. The results will vary based on the type of vehicle, engine displacement, weather and other factors. In certain embodiments, the valve apparatus is configured to operate on OBD1 1988-1996 computer controlled carbureted vehicles.

It shall be appreciated that the components of the valve apparatus described in several embodiments herein may comprise any alternative known materials in the field and be of any color, size, shape and/or dimensions. For example, the end caps' hose barbed diameters will be made adaptive to fit a wide array of vehicles with different diameter PCV hose sizes. It shall be appreciated that the components of the valve apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A valve apparatus configured to control the flow of crankcase gases from a positive crankcase ventilation valve to an intake manifold of an internal combustion engine, the valve apparatus configured to adjust during idle, cruising, acceleration and wide-open throttle modes of the engine to enhance fuel economy, the valve apparatus comprising:
    a vacuum-controlled valve body comprising a main inlet configured to couple to the positive crankcase ventilation valve and a main outlet;
    an orifice piston slidably mounted to an interior of the valve body proximate the main outlet, the orifice piston having an end face comprising a central hole and a plurality of secondary holes disposed therethrough;
    a first end cap coupled to the main outlet of the valve body and configured to couple to the intake manifold of the engine;
    a seal disposed within the first end cap and comprising a central opening; and
    a spring connected to the orifice piston and seal;
    wherein elevated vacuum draw within the valve body at the idle mode of the engine compresses the spring to actuate the orifice piston to a closed position against the seal, thereby sealing the secondary holes in the piston to permit crankcase gases in the valve body to flow through the central hole in the orifice piston and central opening of the seal to the intake manifold, wherein reduced vacuum draw within the valve body at cruising and wide-open throttle modes extends the spring to actuate the orifice piston to an open position away from the seal, thereby permitting crankcase gases in the valve body to flow through the central hole and secondary holes in the orifice piston and central opening of the seal to the intake manifold.

2. The valve apparatus of claim 1, wherein the valve body comprises a second outlet.

3. The valve apparatus of claim 2, further comprising a bowl coupled to the second outlet of the valve body and a filter disposed within the bowl, wherein the filter is configured to capture oil vapor and particulates in the crankcase gases passing through the valve body.

4. The valve apparatus of claim 3, further comprising a second end cap coupled to the main inlet of the valve body and configured to couple to the positive crankcase ventilation valve.

5. The valve apparatus of claim 4, wherein the diameter of each hole in the central hole and secondary holes of the orifice piston is within an approximate range of 0.010"-0.25".

6. A valve apparatus configured to control the flow of crankcase gases from a positive crankcase ventilation valve to an intake manifold of an internal combustion engine, the valve apparatus configured to adjust during idle, cruising, acceleration and wide-open throttle modes of the engine to enhance fuel economy, the valve apparatus configured to deposit captured oil vapor in the crankcase gases to an oil filler neck associated with the engine, the valve apparatus comprising:
    a vacuum-controlled valve body comprising a main inlet configured to couple to the positive crankcase ventilation valve and a main outlet;
    an orifice piston slidably mounted to an interior of the valve body proximate the main outlet, the orifice piston having an end face comprising a central hole and a plurality of secondary holes disposed therethrough;
    a first end cap coupled to the main outlet of the valve body and configured to couple to the intake manifold of the engine;
    a seal disposed within the first end cap and comprising a central opening;
    a spring connected to the orifice piston and seal;
    a bowl coupled to a second outlet of the valve body and having a filter disposed therein, the filter configured to capture oil vapor and particulates in the crankcase gases passing through the valve body; and
    a one-way valve coupled to an outlet of the bowl and configured to couple to the oil filler neck, the one-way valve configured to dispense the captured oil vapor in the bowl to the oil filler neck;
    wherein elevated vacuum draw within the valve body at the idle mode of the engine compresses the spring to actuate the orifice piston to a closed position against the seal, thereby sealing the secondary holes in the piston to permit crankcase gases in the valve body to flow through the central hole in the orifice piston and central opening of the seal to the intake manifold, wherein reduced vacuum draw within the valve body at cruising and wide-open throttle modes extends the spring to actuate the orifice piston to an open position away from the seal, thereby permitting crankcase gases in the valve body to flow through the central hole and secondary holes in the orifice piston and central opening of the seal to the intake manifold.

7. The valve apparatus of claim 6, wherein the one-way valve is configured to adjust to a closed position during the idle mode of the engine and an open position during wide-open throttle mode of the engine.

8. The valve apparatus of claim 7, further comprising a flange connecting the one-way valve and oil filler neck.

9. The valve apparatus of claim 8, further comprising a second end cap coupled to the main inlet of the valve body and configured to couple to the positive crankcase ventilation valve.

10. The valve apparatus of claim 9, wherein the diameter of each hole in the central hole and secondary holes of the orifice piston is within an approximate range of 0.010"-0.25".

* * * * *